UNITED STATES PATENT OFFICE.

JOSEPH L. TURNER, OF PHILADELPHIA, PENNSYLVANIA, ASSIGNOR TO THE H. K. MULFORD COMPANY, OF PHILADELPHIA, PENNSYLVANIA, A CORPORATION OF PENNSYLVANIA.

PROCESS OF PRODUCING A METALLIC DERIVATIVE OF THE ACTIVE PRINCIPLE OF THE SUPRARENAL GLANDS.

1,016,185. Specification of Letters Patent. Patented Jan. 30, 1912.

No Drawing. Application filed August 8, 1911. Serial No. 643,048.

*To all whom it may concern:*

Be it known that I, JOSEPH L. TURNER, a subject of the Emperor of Russia, having declared my intention of becoming a citizen of the United States, residing in Philadelphia, Pennsylvania, have invented a certain Improved Process for Producing a Metallic Derivative of the Active Principle of the Suprarenal Glands, of which the following is a specification.

The object of this invention is to obtain metallic derivatives of the active principle of the suprarenal glands which shall possess the active blood pressure raising, astringent and hemostatic characteristics and properties of the suprarenal glands in a concentrated form, and the invention consists in the process hereinafter more particularly described, of treating a fluid extract of the suprarenal glands with a salt of a metal whereby the metal of such salts replaces the hydrogen of the hydroxyl groups of the benzene ring, of the active principle of the glands.

In carrying out the process I make a fluid extract of cleansed and comminuted suprarenal capsules from cattle, sheep, etc., by mixing the comminuted capsules with about their own weight of water, preferably slightly acidified by sulfuric or other suitable acid, to which a small portion of zinc dust may be added as a precaution against oxidation, evaporating at a low temperature, preferably *in vacuo*, and to a small volume, the liquid remaining after straining and pressing off or filtering the mixture, pouring the concentrated liquid into a larger volume of high proof alcohol, filtering off the resulting precipitate and treating said filtrate with a salt of a metal. Upon adding to the slightly acid filtrate resulting from this treatment a quantity of ammonia sufficient to "neutralize" the same, the metallic derivative of the active principle of the gland separates in the form of a flocculent precipitate. This precipitate is filtered off, washed in alcohol or ether to free it from mother liquor, and dried, and is the product of my improved process.

A specific example of my improved process is as follows: Fifty pounds of suprarenal glands are disintegrated, and are mixed with five gallons of water to which one ounce of concentrated sulfuric acid, and two ounces of zinc dust have been added. This mixture is then brought up gradually to the temperature of 75° C. and kept at this temperature for say fifteen minutes. The glands are then strained and pressed off, and the residue is treated with an additional five gallons of water in the same manner, and again strained and pressed off. The extracts thus obtained are mixed, and the mixture cooled and filtered. The filtrate is now evaporated at low temperature *in vacuo* to about 600 c. c. and poured into 6000 c. c. of 95 per cent. ethyl alcohol, the mixture being constantly stirred during pouring. The precipitate thus formed is filtered off and to the filtrate is added 350 grams of powdered alum (potassium aluminum sulfate) either dry or in the form of a solution, and this mixture is constantly shaken for from 2 to 3 hours. The liquid is then again filtered and the slightly acid filtrate neutralized by the addition of ammonia; thereupon, a precipitate of an aluminum compound of the active principle of the suprarenal glands separates out, and after standing for an hour in a cool place is filtered off, washed with alcohol and ether, and dried. The aluminum compound thus obtained is a yellowish white amorphous powder, possessing the physiological characteristics of the active principle of the suprarenal gland in concentrated form, but differing from that active principle as heretofore isolated, in the particulars among others of being a metallic derivative, in being amorphous, readily soluble in water at ordinary temperatures, and having no ascertainable melting point.

While in the practice of my process I prefer to use salts of metals, such as alum or a zinc salt, since their use produces a precipitate from which colorless aqueous, or other solutions may be prepared, it will be understood that my process may be practiced, using therein various other salts of metals capable of substituting the hydrogen of the hydroxyl groups of the benzene ring of the active principle of the glands; such salts, for example, as ferric chlorid, ferric ammonium sulfate, and chromium potassium sulfate.

By the phrase "fluid extract of said glands" as used in the following claims, I mean a fluid digest or solution of such glands, containing active principle which has not undergone precipitation.

Claims:

1. The within described process of producing a metallic derivative of the active principle of the suprarenal glands, said process consisting in preparing a fluid extract of said glands, and adding thereto a salt of a metal.

2. The within described process of producing a metallic derivative of the active principle of the suprarenal glands, said process consisting in preparing a fluid extract of said glands, adding thereto a salt of a metal, and precipitating, by means of an alkali, the metallic derivative of the active principle thus formed.

3. The within described process of producing a metallic derivative of the active principle of the suprarenal glands, said process consisting in making a fluid solution of suprarenal capsules, concentrating the said solution by evaporation, treating the concentrated solution with alcohol, adding to the resulting filtrate a salt of a metal, and then adding an alkali to precipitate the thus formed metallic derivative of the active principle.

4. The within described process of producing a metallic derivative of the active principle of the suprarenal glands, said process consisting in making a fluid solution of suprarenal capsules, concentrating the said solution by evaporation, treating the concentrated solution with alcohol, adding to the resulting filtrate a salt of a metal, and then adding an alkali to precipitate the thus formed metallic derivative of the active principle, and washing and drying said precipitate.

5. The within described process of producing a metallic derivative of the active principle of the suprarenal glands, said process consisting in adding powdered alum to a fluid extract of said glands.

6. The within described process of producing a metallic derivative of the active principle of the suprarenal glands, said process consisting in adding powdered alum to a fluid extract of said glands, and then adding a suitable alkali to precipitate the metallic derivative of the active principle thus formed.

In testimony whereof, I have signed my name to this specification, in the presence of two subscribing witnesses.

JOSEPH L. TURNER.

Witnesses:
 CHARLES HOWSON,
 JOS. H. KLEIN.